United States Patent [19]

Hettinga

[11] 4,307,057

[45] Dec. 22, 1981

[54] METHOD FOR ALIGNING AN INJECTION MOLD WITH A NOZZLE AT THE MOLD INJECTION STATION

[76] Inventor: Siebolt Hettinga, 8000 University Ave., Des Moines, Iowa 50311

[21] Appl. No.: 159,145

[22] Filed: Jun. 13, 1980

[51] Int. Cl.³ .............................................. B29F 1/00
[52] U.S. Cl. ................... 264/328.8; 425/576; 264/328.11
[58] Field of Search ............... 425/576; 264/328.8, 264/328.11

[56] References Cited

U.S. PATENT DOCUMENTS

| | | | |
|---|---|---|---|
| 959,011 | 5/1910 | Herman | 425/576 X |
| 2,327,227 | 8/1943 | Tucker | 425/576 X |
| 2,333,056 | 10/1943 | Thoreson | 425/576 X |
| 2,431,843 | 12/1947 | Swoger | 425/576 |
| 3,327,354 | 6/1967 | Son | 425/149 |

*Primary Examiner*—Thomas P. Pavelko
*Attorney, Agent, or Firm*—Rudolph L. Lowell; G. Brian Pingel

[57] ABSTRACT

The method of aligning the injection nozzle of a mold injection machine of carousel type with the ingate opening of a mold supported on the carousel which comprises the steps of first rotating the carousel to an initial mold position at the mold injection station by an indexing mechanism and then with the indexing mechanism disengaged from the carousel, adjustably moving and locking the carousel by a releasable locking mechanism into the mold injection position wherein the nozzle is movable into and out of operative engagement with the mold ingate opening. The location of a mold at the injection position therefor is initially predetermined by and then accurately relocated and maintained by the locking mechanism during the mold injection cycle.

6 Claims, 11 Drawing Figures

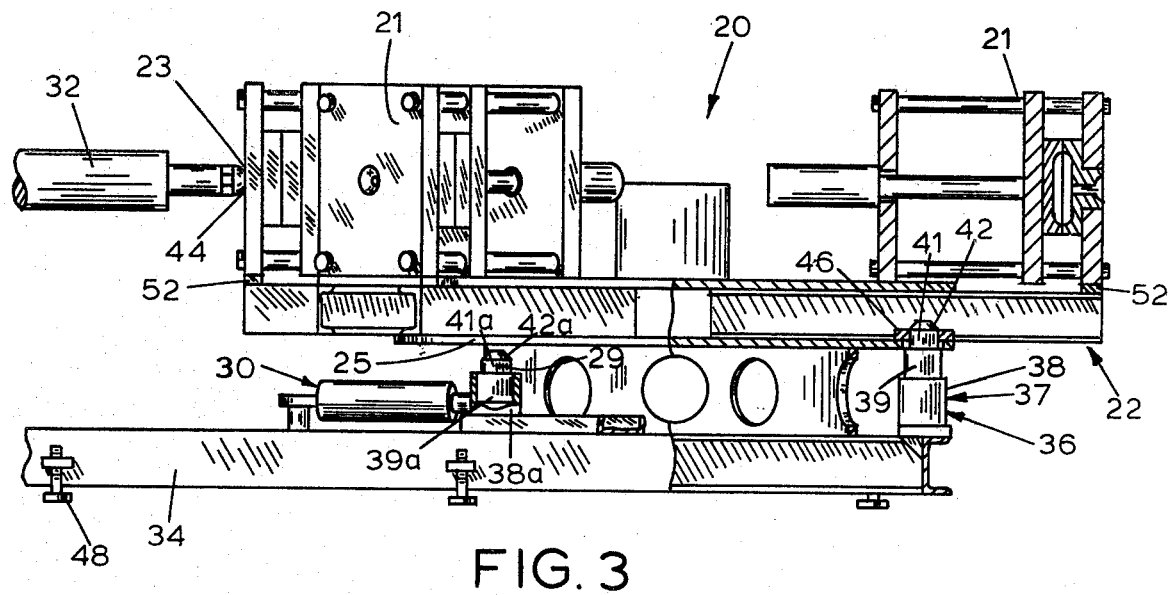
FIG. 3
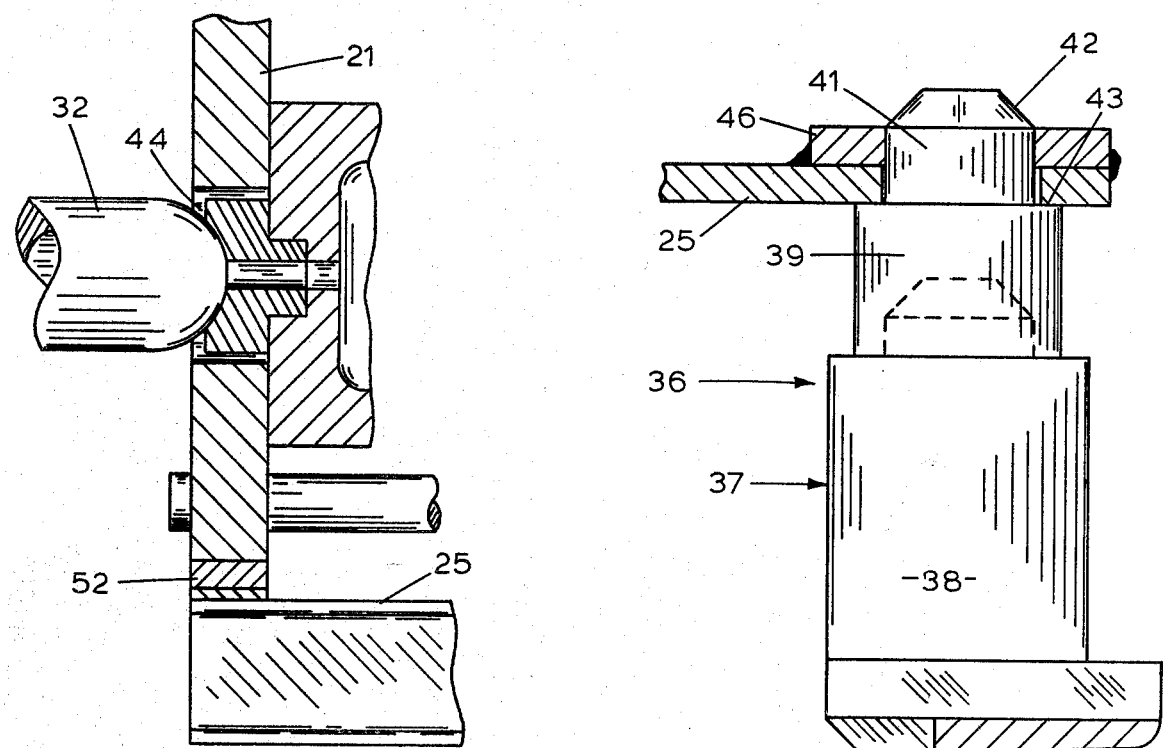
FIG. 4
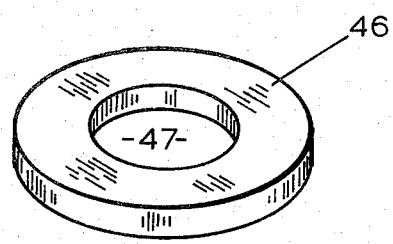
FIG. 5
FIG. 6

METHOD FOR ALIGNING AN INJECTION MOLD WITH A NOZZLE AT THE MOLD INJECTION STATION

BACKGROUND OF THE INVENTION

Plastic molding machines of carousel or turntable type generally include a linearly movable injection head having a plurality of molds carried on the turntable. The table is rotated in increments by an indexing mechanism and moved sequentially to locate a mold at a mold injection station. At the mold injection station the injection head is moved into and out of operative engagement with the mold. Control means responsive to the filling of a mold actuates the indexing mechanism and the injection head. In this type of machine appreciable difficulty is encountered in the precision requirements of machining and assembling the indexing mechanism to accurately locate a mold at the injection station for operative engagement with the injection head and of providing a locking mechanism that will lock the mold in such a position when the indexing mechanism is disengaged from the turntable.

Thus, in U.S. Pat. No. 3,327,354 intermittent rotation of the table to sequentially align the molds with the injection head is provided by means of a mechanical linkage adapted to releasably engage any of a plurality of indexing pins extended from the table and corresponding in number to the molds. The pins are also engageable by a locking mechanism which includes a bifurcated locking member movable into a straddling relation with a pin at the mold injection station.

A gear type indexing mechanism for a mold turntable is disclosed in U.S. Pat. No. 3,621,533. For each intermittent rotation of the table a pitch advancement of a drive gear must be made through an angle equal to 360°/14, to provide fourteen stops for each revolution of the table. The indexing mechanism functions to hold the table at an indexed position.

The molding machine of U.S. Pat. No. 3,314,112 has an indexing mechanism which includes a swing arm having a wedge plate engageable with pins on a turntable to provide table rotation. An indexed position is defined by a spring pressed ball that drops into a recess on the table each time the table rotates through the proper arc increment.

In U.S. Pat. No. 3,413,682, the rotational speed of the table is progressively reduced so that at a molding station the rotational speed is substantially zero. The mold alignment means is arranged to operate when the rotation of the table is stopped or its speed is substantially zero so as to eliminate excessive wear on the indexing mechanism and alignment means.

SUMMARY OF THE INVENTION

The invention provides for an economically efficient and simple method for positively and accurately aligning the ingate opening of a mold form for operative engagement with an injection nozzle at the mold injection station. The method eliminates the necessity for a precision machining and assembly of the carousel indexing mechanism to accurately locate the mold form at the injection position since the locking mechanism functions to move the carousel from its initial indexed position for locating the mold at the injection station, to the injection position at the injection station. This is accomplished by first aligning the mold ingate opening for operative engagement with the injection nozzle and then adjusting the locking mechanism to the carousel for locking engagement therewith at the mold injection position. The mold injection position is thus accurately re-located on actuation of the locking mechanism into engagement with the carousel. The mold injection position is thus positively predetermined by adjusting the locking mechanism to the injection position, thereby eliminating the excessive manufacturing costs now required by precision attempts to design the injection position into the machine.

DESCRIPTION OF THE DRAWINGS

FIG. 3 is a side elevational view of the machine as shown in FIG. 1 with some parts broken away and other parts shown in section to more clearly illustrate the construction of the carousel unit and the molds thereon;

FIG. 4 is an enlarged sectional detail view taken along the line 4—4 in FIG. 2;

FIG. 5 is a detail perspective view of a guide plate for adjustably setting the carousel in an index position which defines the injection position of a mold on the carousel;

FIG. 6 is an enlarged showing of the operative relation of a locking pin with a carousel illustrated generally in FIG. 3;

DETAILED DESCRIPTION OF THE INVENTION

Figure 1:
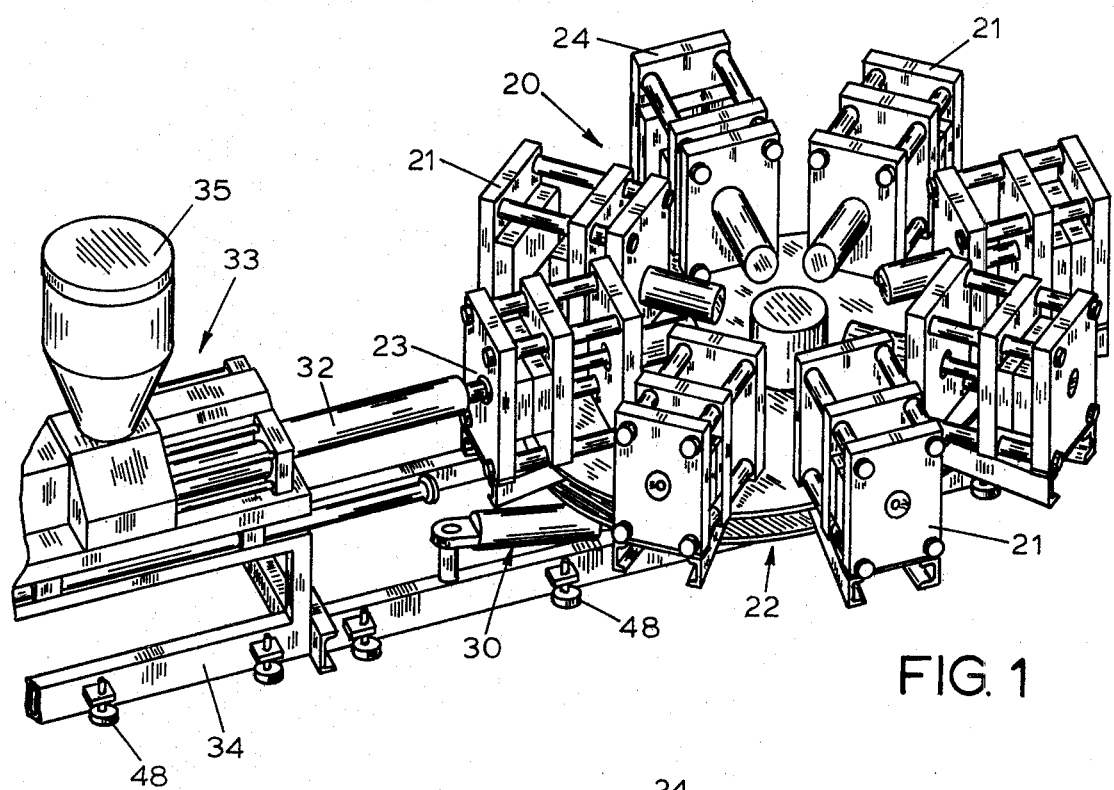
FIG. 1 is a top perspective view of a mold injection machine of carousel type.
Figure 2:
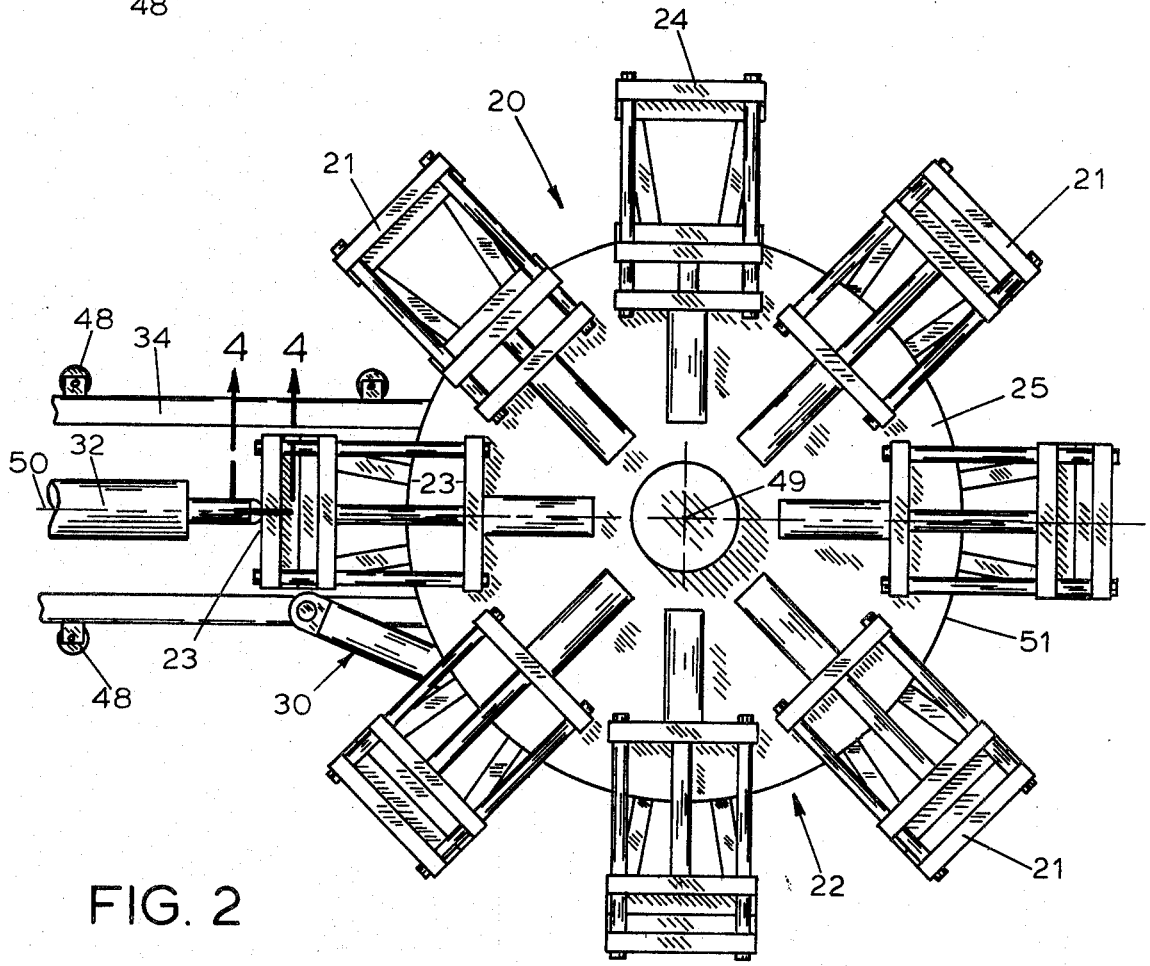
FIG. 2 is a plan view of the machine in FIG. 1.
Figure 7:
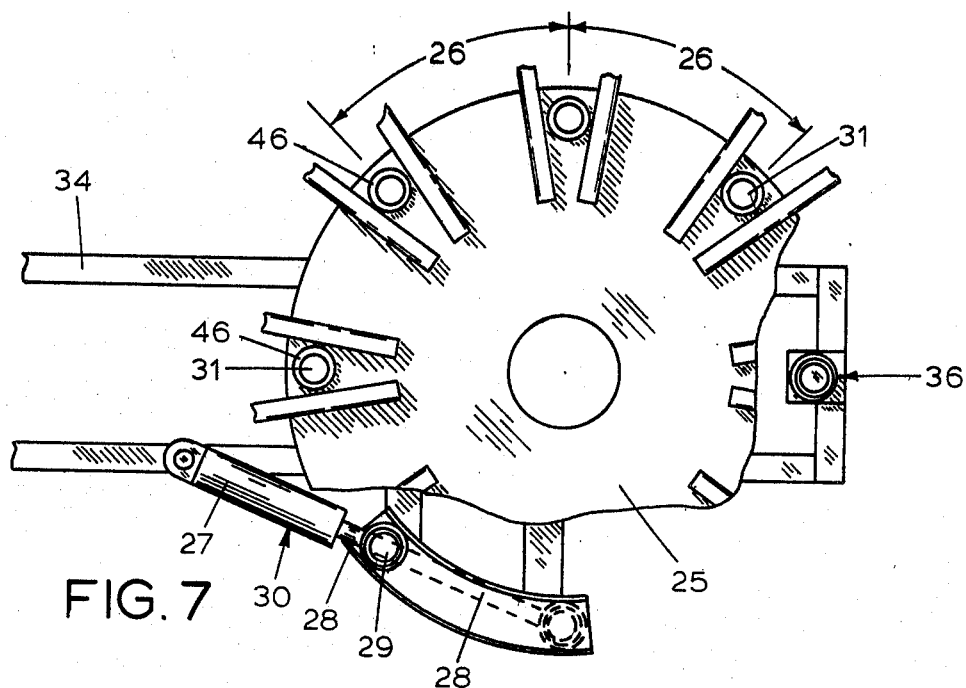
FIG. 7 is a plan view of the carousel unit with the molds removed and with parts broken away to show the carousel indexing mechanism.

In FIG. 1 there is illustrated a plastic injection molding machine 20 of a usual reciprocating screw type shown in operative association with a plurality of mold forms 21, indicated as eight in number, and equally spaced about a carousel or turntable unit 22 which is intermittently rotated to a designated station such as an injection station 23 and unloading station 24 (FIG. 2). As shown in FIG. 7, the carousel unit includes a flat indexed plate 25 of a circular shape for supporting the mold forms 21. The carousel unit is rotated in equal increments 26 corresponding to the spacings between the mold stations by means of an indexing mechanism 30 which includes an air cylinder unit 27 having a piston rod 28 equipped with an upright movable latch pin 29 that is releasably engageable with the carousel frame unit 22 at circumferentially spaced openings or indexed positions 31 formed in the plate 25.

On extension of the piston rod 28, to its dotted line position, shown in FIG. 7, the carousel unit 22 is rotated through an increment 26 and when the rod 28 is to be retracted the latch pin 29 is simultaneously released from the indexed plate 25 for later insertion in the retracted position of the rod, within a next adjacent opening 31 in the indexed plate 25. With the mold 21 at the injection station 23 and in an injection position for operative engagement with an injection nozzle 32, which forms part of an injection screw assembly 33, the screw assembly is reciprocally movable to position the injection nozzle into operative engagement with the mold. On completion of the injection cycle, the nozzle is retracted from a mold to permit a station to station rotation of the carousel unit 22. The molding material for injection into a mold form 21 is supplied to the screw assembly from a hopper 35. The injection screw assembly 33 and the carousel unit 22 are mounted on a common elongated base frame 34.

The injection or molding machine 20 is thus seen to be of a generally conventional structure except for the provision of a locking mechanism 36 that is operatively associated with the carousel unit 22 for moving and accurately locking the carousel unit at a position corresponding to the injection position of a mold 21 at the injection station therefor.

The locking mechanism 36 (FIGS. 3 and 6) includes an air cylinder unit 37 of a double acting type that has an upright cylinder 38 and an associated upwardly extendable piston or locking pin 39. The upper end section 41 of the locking pin 39 is of a reduced diameter and terminates in a cone or tapered portion 42. The junction of the reduced upper section 41 of the locking pin with the body of the pin is defined by a shoulder 43. As shown in FIG. 3, the pin 29 of the indexing mechanism 30 is of the same size and shape as the locking pin 39 with like parts of the pin 29 being indicated by like numbers having the suffix a.

Coacting with the locking pin 39 to accurately locate a mold 21 at the injection station 23 with its ingate opening 44 (FIG. 4) in operative alignment with the injection nozzle 32 is a locking plate or member 46 illustrated in FIG. 5 as being of a flat ring shape. The locking member 46 has a central opening 47 of a size to receive in a close working tolerance or precision fit the reduced section 41 of the locking pin 39 or indexing pin 29. The diameter of an indexed hole 31 in the indexed plate 25 is slightly larger than the diameter of a central opening 47 in a locking plate 46. For example, the indexed hole 31 may have a diameter of 2.50 inches and the locking hole 47 a diameter of 2.40 inches for a diameter of 2.37 inches for the reduced section 41 of a pin 29 or 39. The locking plate 46 is rigidly secured to the indexed plate 25 by weldments or other suitable means with the opening 47 therein located within the confines of an associated indexed hole 31 at a position determined by the axial alignment of the nozzle 32 with the mold 21 at the ingate opening 44 thereof. The location of the locking plate 46 relative to the indexed plate 25 to accurately locate a mold 21 in the injection position therefor at the station 23 is obtained in the following manner.

The base frame 34 of the machine 20, which is common to the injection screw assembly 33 and carousel unit 22, is provided with horizontal leveling devices 48. The injection screw assembly 33 is mounted at one end of the base frame 34 with the injection nozzle 32 extended longitudinally of the frame toward the other end thereof, which carries the carousel unit 22. With the frame 34 horizontally leveled, by relative adjustment of the devices 48, the carousel unit 22 is mounted thereon with its center axis 49 (FIG. 2) in a vertical plane common to the longitudinal axis 50 of the injection nozzle 32. As a result, longitudinal axis 50 is in substantial alignment with the diameter 51 of the carousel indexed plate 25 on which the molds 21 are centered when at the injection station 23 therefor.

The carousel unit 22 is of a construction such that when it is rotatably supported on the base frame 34 the indexed plate 25 is vertically located relative to the longitudinal axis 50 of the nozzle 32 to permit a vertical adjustment of a mold ingate opening 44 relative to such longitudinal axis.

With the mold forms 21 mounted on the indexed plate 25, the indexing mechanism 30 is actuated to move a mold form to an initial or first position at the injection station 23 determined in part by the stroke of the piston rod 28, and by the relative variations of the increments 26. At this initial position of the mold form 21, the indexing or latch pin 29 is released from the indexed plate 25 and the mold form 21 vertically adjusted relative to the plate 25 and laterally moved with the carousel relative to the injection nozzle 32 to an injection position wherein the nozzle 32 is in alignment with the mold ingate opening 44 for operative engagement therewith (FIG. 4). As illustrated in FIG. 4, vertical adjustment of a mold form 21 may be obtained by the placing of shims 52 between the mold form and the indexing plate 25. Lateral adjustment of a mold 21 relative to the nozzle 32 is accomplished by a manual rotation of the carousel unit 22 since the index pin 29 is in its retracted position.

With the nozzle 32 retained in operative engagement within the ingate opening 44 of a mold 21, the locking mechanism 36 is actuated to insert or extend the locking pin 39 upwardly into an index hole 31 other than the indexed hole from which the latch pin 29 was retracted (FIG. 4). The reduced section 41 of the locking pin 39 projects upwardly from the indexed plate 25 to a stop position defined by engagement of the shoulder 43 with the lower surface of the plate 25. The locking member 46 is mounted about the projected portion of the reduced pin section 41 in resting support on the indexed plate 25 to which it is then rigidly secured. With the locking member 46 and the locking pin 39 engageable in a precision fit or minimum working tolerance at the opening 47 and with the location of the locking member on the indexed plate 25 determined by the operative engagement of a mold form 21 with the nozzle 32 at the injection position of the mold form, such injection position will be accurately relocated on a later extension of the locking pin 39 within the central opening 47 of the locking plate 46. It is apparent that this accurate relocation of the injection position takes place regardless of any machining variations in the diameter of the indexed holes 31 or in their relative spacings.

Each mold form 21 on the carousel unit 22 is similarly adjusted at the injection station 23 for operative engagement with the common injection nozzle 32. It is seen, therefore, that in the operation of the machine 20 each mold form 21 is finally moved into and then locked in the injection position therefor by the occurrence of what might be termed a vernier rotational adjustment of the plate 25 by the locking mechanism 36 at the end of each incremental movement of the carousel unit 22 by the indexing mechanism 30. In this operation, the indexing pin 29 and locking pin 39 are synchronized for alternate engagement with the indexed plate 25, namely, only one of such pins is engaged at any one time with the plate 25.

Figures 8, 9:
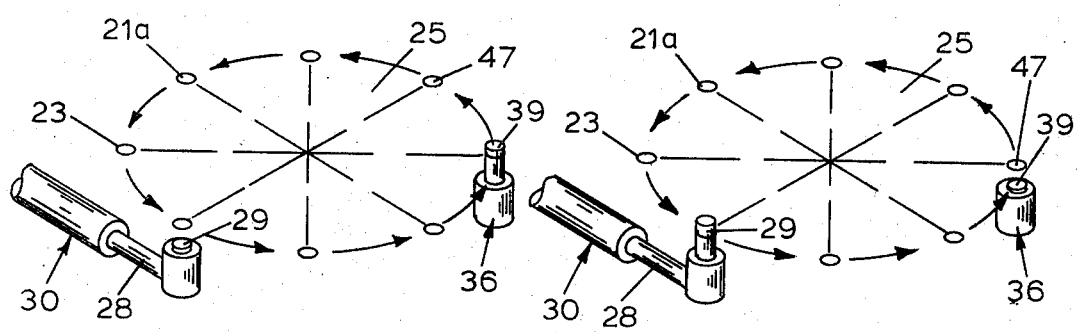
FIG. 8 is a diagrammatic illustration showing the relative positions of the carousel indexing and locking mechanisms when a mold is locked in the injection position therefor.
FIG. 9 is illustrated similarly to FIG. 8 and shows the locking mechanism released and the indexing mechanism in a carousel moving position.

Thus, referring to FIG. 8, the indexed plate 25 is in a position providing for the location of a mold form in its injection position at the injection station 23. The rod 28 and indexing pin 29 are thus retracted and the locking pin 39 is extended through an adjacent opening 47 of a locking member 46.

Figures 10, 11:
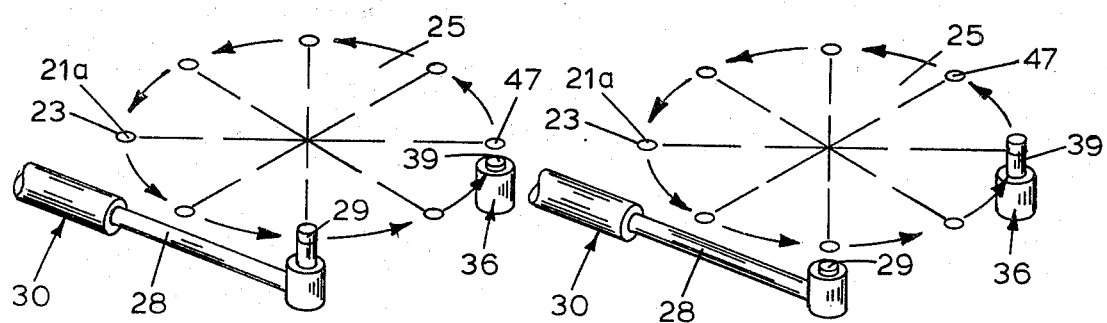
FIG. 10 is illustrated similarly to FIG. 9 and shows the carousel moved into a next adjacent indexed position by the index mechanism.
FIG. 11 is illustrated similarly to FIG. 10 and shows the carousel moved into a next adjacent mold injection position by the locking mechanism.

On completion of the mold injection, and as shown in FIG. 9, the locking pin 39 is retracted and the indexing pin 29 extended into the opening 47 thereabove to provide, on extension of the rod 28, for the incremental movement of the carousel plate 25 to move a next mold form 21 into the injection station 23, as shown in FIG. 10. The mold form 21 is thus in an initial position at the injection station 23 wherein the rod 28 is extended and the indexing pin 29 engaged with the indexed plate 25. It is to be noted that the locking pin 39 remains retracted. On retraction of the pin 29 simultaneously with the extension of the pin 39, as shown in FIG. 11, the carousel plate 25 is finally moved by the locking pin 29 to provide for the mold at the injection station 23 being located in the injection position therefor for operative engagement with the injection nozzle 32. The rod 28 is then retracted to locate the parts to their positions in FIG. 8 for the injection cycle.

It is thus seen that the actuations of the indexing mechanism 30 and locking mechanism 36 are synchronized so that when the pin 29 is engaged to rotate the indexed plate 25 through an incremental distance 26, the locking pin 39 is retracted. However, on completion of the incremental movement, the pin 29 is retracted prior to the extension of the locking pin 39 so that at no time are the pins 29 and 39 seeking simultaneous engagement with the indexed plate 25. The air actuated equipment on the machine 20 receives air under pressure from an air pressure supply system (not shown). It is to be further understood that the locking pin 39 remains engaged with the plate 25 throughout the injection cycle of a mold form 21 so that the injection nozzle 32 is freely movable into and out of operative engagement with the mold form at all times. The injection cycle, as is well known, may be varied in duration depending upon the kind and amount of the injection charge.

Suitable control circuits (not shown) synchronize the actuation of the screw assembly 33, indexing mechanism 30, locking mechanism 36 and duration of the injection cycle. Since each mold form 21 is independently located at the injection position therefor relative to the nozzle 32, mold forms different from each other, or wherein some are the same but differing from the remainder may be carried on the carousel or index plate 25. The molding machine 21 may thus be used to produce a variety of different articles, no one of which would be sufficient to justify the economical operation of the machine. In such case the control circuits would merely be adjusted to vary duration of the injection cycle for each mold form, since with the injected or molded material being the same, the operation of the machine 20 will remain the same. Although the injection molding machine 20 is illustrated with carousel mounted mold forms 21 movable relative to the injection nozzle unit or assembly 33, it is to be understood that the method of this invention is applicable to an injection molding machine wherein the mold forms are carried in a spaced relation on a support unit for operative engagement with a reciprocally movable nozzle unit mounted for movement to a position opposite a selected mold form.

Although the invention has been described with respect to a preferred embodiment thereof, it is to be understood that it is not to be so limited since changes and modifications can be made therein which are within the full intended scope of this invention as defined by the appended claims.

I claim:

1. The method of aligning the ingate opening of each mold of a plurality of injection molds arranged in spaced relation on a supporting unit for selective operative engagement with an injection nozzle unit at a mold injection station, comprising:
    (a) indexing one of said units with relatively spaced engageable indexed positions for movement thereof into and out of a mold injection station by an indexing mechanism having a drive member engageable with the one unit at an indexed position providing for an initial location of the one unit at the injection station,
    (b) disengaging the drive member from the one unit at said initial location thereof,
    (c) relatively adjusting a mold and the injection nozzle unit at the injection station to a mold injection position wherein the mold ingate opening is operatively engaged with the injection nozzle unit,
    (d) maintaining the mold ingate opening operatively engaged with the injection nozzle unit concurrently with engaging a locking pin of a releasable locking mechanism with a selected portion of the one unit, and then
    (e) providing a working tolerance between the locking pin and the selected portion of the one unit so that a later engagement of the locking pin with said selected portion positively relocates the mold ingate opening in the injection position for operative engagement with the injection nozzle unit.

2. The method of aligning the ingate opening of each mold of a plurality of injection molds mounted on a carousel for sequential operative engagement at a mold injection station with a horizontal reciprocally movable injection nozzle, comprising:
    (a) indexing the carousel with circumferentially spaced engageable indexed positions for sequential rotary movement of a mold into and out of the mold injection station by an indexing mechanism having a drive member engageable with the carousel at an indexed position providing for an initial location of the mold at the injection station,
    (b) disengaging the drive member from the carousel at said initial indexed location of the mold,
    (c) adjustably moving a mold and the carousel at the injection station relative to the injection nozzle to an injection position wherein the mold ingate opening is in operative engagement with the injection nozzle,
    (d) maintaining the injection position of the mold concurrently with engaging a locking pin of a releasable locking mechanism with an indexed position on the carousel other than the indexed position from which the drive member was disengaged, and then
    (e) adjusting the working tolerance of the locking pin with the carousel at the other indexed position so that a later engagement of the locking member with the carousel at the other indexed position relocates and locks the carousel at the injection station in the adjusted injection position of the mold.

3. The method according to claim 2, including the steps of:
   (a) providing a common horizontally level elongated base frame for the carousel and injection nozzle,
   (b) mounting the injection nozzle on the base frame for reciprocal horizontal movement longitudinally of the base frame,
   (c) rotatably supporting the carousel on the base frame for rotation about a vertical axis lying in a plane substantially common to the axis of the injection nozzle, and then
   (d) vertically moving the mold to adjust the mold ingate opening relative to the axis of the injection nozzle.

4. The method of aligning the ingate opening of each mold of a plurality of injection molds mounted on a carousel for sequential operative engagement at a mold injection station with a horizontal reciprocally movable injection nozzle, comprising:
   (a) indexing the carousel with circumferentially spaced pin-receiving holes for sequential rotary movement of a mold into and out of the mold injection station by an indexing mechanism having a drive pin engageable with the carousel at a pin-receiving hole providing for an initial position of the mold at the injection station,
   (b) removing the drive pin from the carousel at said initial position of the mold,
   (c) adjusting the carousel at the injection station to an adjusted position that provides an injection position of the mold wherein the mold ingate opening is in operative engagement with the injection nozzle,
   (d) maintaining the adjusted position of the carousel concurrently with inserting the pin of a releasable locking mechanism into an indexed hole other than the hole from which the drive pin was removed, and then
   (e) adjusting the working tolerance of the locking pin with the carousel at the other indexed hole so that a later insertion of the locking pin therein moves the carousel to the adjusted position therefor and then locks the carousel in the adjusted position.

5. The method according to claim 4, including the step of:
   (a) operatively interconnecting the indexing mechanism and the releasable locking mechanism to automatically move the drive pin and the locking pin into and out of engagement with the carousel at the pin-receiving holes therein so that the drive pin controls the indexed rotation of the carousel to the initial position of a mold at the injection station therefor and the locking pin adjustably moves and locks the carousel in the injection position of a mold at the injection station therefor.

6. The method according to claim 4 including the step of:
   (a) maintaining only the locking pin engaged with the carousel in the injection position of the mold during the mold injection cycle.

* * * * *